(12) United States Patent
Maeder et al.

(10) Patent No.: US 12,038,393 B2
(45) Date of Patent: Jul. 16, 2024

(54) METHODS AND APPARATUS FOR MEASURING FASTENER CONCENTRICITY

(71) Applicant: The Boeing Company, Chicago, IL (US)

(72) Inventors: Thomas Maeder, Bothell, WA (US); Jyani S. Vaddi, Bangalore (IN); William D. Meade, Tacoma, WA (US)

(73) Assignee: The Boeing Company, Arlington, VA (US)

(*) Notice: Subject to any disclaimer, the term of this patent is extended or adjusted under 35 U.S.C. 154(b) by 132 days.

(21) Appl. No.: 17/562,776

(22) Filed: Dec. 27, 2021

(65) Prior Publication Data

US 2022/0214290 A1    Jul. 7, 2022

Related U.S. Application Data

(60) Provisional application No. 63/134,067, filed on Jan. 5, 2021.

(51) Int. Cl.
*G01N 23/04* (2018.01)

(52) U.S. Cl.
CPC ....... *G01N 23/04* (2013.01); *G01N 2223/401* (2013.01); *G01N 2223/60* (2013.01)

(58) Field of Classification Search
None
See application file for complete search history.

(56) References Cited

U.S. PATENT DOCUMENTS

| | | | | | |
|---|---|---|---|---|---|
| 4,053,782 | A | * | 10/1977 | Grass | A61B 6/08 378/162 |
| 4,271,393 | A | * | 6/1981 | Hansen | G01V 3/08 324/240 |

(Continued)

FOREIGN PATENT DOCUMENTS

| CN | 107831180 B | | 3/2020 |
|---|---|---|---|
| CN | 111707220 A | * | 9/2020 |
| EP | 2208963 A1 | | 7/2010 |

OTHER PUBLICATIONS

Machine Translation of CN-110986834-A (Year: 2020).*

(Continued)

*Primary Examiner* — David P Porta
*Assistant Examiner* — Djura Malevic
(74) *Attorney, Agent, or Firm* — Kolitch Romano Dascenzo Gates LLC

(57) ABSTRACT

Systems and methods inspect a fastener installed at least partially through a hole in a part, by measuring fastener concentricity, measuring fastener flushness with a surface, and/or detecting foreign object debris near the fastener. Systems include an x-ray imaging system, a first camera device, a second camera device, a first support structure, and at least one processing unit. The first camera device produces a first image of the fastener from a first vantage point, and the second camera device produces a second image of the fastener from a second vantage point, such that a 3D image of the fastener can be created from the first image and the second image. The system inspects the fastener based on the x-ray image and/or the 3D image, to determine concentricity and/or flushness of the fastener. Systems may be automated and mounted on robot arms to be positioned relative to the fasteners being inspected.

20 Claims, 8 Drawing Sheets

(56) References Cited

U.S. PATENT DOCUMENTS

| | | | | |
|---|---|---|---|---|
| 6,150,809 | A * | 11/2000 | Tiernan | G01N 27/82 324/252 |
| 7,115,869 | B2 * | 10/2006 | Shelley | G01N 21/3563 250/341.8 |
| 7,627,081 | B2 * | 12/2009 | Bontus | A61B 6/4014 378/4 |
| 7,747,099 | B2 * | 6/2010 | Hutchinson | G06T 5/009 382/128 |
| 7,885,381 | B2 * | 2/2011 | Nagumo | G01N 23/046 378/59 |
| RE42,913 | E * | 11/2011 | Wild | G02B 5/12 250/342 |
| 8,774,349 | B2 * | 7/2014 | Muenker | G01N 23/046 378/4 |
| 8,841,904 | B1 * | 9/2014 | Brady | G01R 33/093 324/252 |
| 9,739,058 | B1 * | 8/2017 | Newsome | E04C 1/39 |
| 9,789,549 | B2 * | 10/2017 | Nguyen | B23B 47/34 |
| 10,000,927 | B1 * | 6/2018 | Newsome | E04C 1/00 |
| 10,168,287 | B2 * | 1/2019 | Georgeson | G01S 13/88 |
| 10,295,480 | B2 * | 5/2019 | Hutchinson | G01N 23/18 |
| 10,352,886 | B2 * | 7/2019 | Brady | G01N 27/025 |
| 10,436,640 | B2 * | 10/2019 | Skoyles | G01J 3/108 |
| 10,557,825 | B2 * | 2/2020 | Safai | G01N 27/9046 |
| 10,657,419 | B2 * | 5/2020 | Kurtz | G06T 7/0006 |
| 10,710,615 | B2 * | 7/2020 | Georgeson | G01M 17/10 |
| 10,740,919 | B2 * | 8/2020 | Rennison | G01B 21/042 |
| 11,009,469 | B2 * | 5/2021 | Georgeson | G01N 22/02 |
| 11,347,039 | B2 * | 5/2022 | Khosravani | G02B 21/0032 |
| 11,540,800 | B2 * | 1/2023 | Koken | A61B 5/0077 |
| 11,560,029 | B2 * | 1/2023 | Rosi | G01B 5/20 |
| 11,585,768 | B1 * | 2/2023 | Na | G01N 23/083 |
| 11,589,474 | B2 * | 2/2023 | Criminale | H01L 21/67253 |
| 11,639,905 | B2 * | 5/2023 | Musgrave | G01N 23/04 378/60 |
| 11,668,660 | B2 * | 6/2023 | Nisius | G01N 23/04 378/60 |
| 11,670,053 | B2 * | 6/2023 | Uher | G01N 29/265 378/21 |
| 2002/0181653 | A1 * | 12/2002 | Birdwell | G01N 23/04 378/58 |
| 2003/0080735 | A1 * | 5/2003 | Wache | G01N 27/902 324/228 |
| 2003/0173959 | A1 * | 9/2003 | Paulson | G01N 27/902 324/240 |
| 2004/0165760 | A1 * | 8/2004 | Veneruso | G06T 7/0004 382/141 |
| 2004/0254456 | A1 * | 12/2004 | Ritter | A61B 90/36 600/425 |
| 2006/0290349 | A1 * | 12/2006 | Na | G01N 27/9006 324/228 |
| 2007/0019784 | A1 * | 1/2007 | Ting | G21K 1/10 378/21 |
| 2008/0037701 | A1 * | 2/2008 | Banks | A61B 6/547 378/11 |
| 2008/0260093 | A1 * | 10/2008 | Bontus | A61B 6/4007 378/9 |
| 2008/0267345 | A1 * | 10/2008 | Nagumo | G01N 23/046 378/11 |
| 2009/0206831 | A1 * | 8/2009 | Fermon | G01N 27/9046 324/240 |
| 2009/0232412 | A1 * | 9/2009 | Hutchinson | G06T 7/001 345/589 |
| 2012/0271590 | A1 * | 10/2012 | Sakhare | B25J 9/1692 702/141 |
| 2013/0034203 | A1 * | 2/2013 | Wang | A61B 6/5247 378/62 |
| 2014/0285658 | A1 * | 9/2014 | Mian | G06T 7/60 348/136 |
| 2015/0281680 | A1 * | 10/2015 | Grafenberg | G06T 19/006 348/50 |
| 2016/0141154 | A1 * | 5/2016 | Kamata | G01B 7/023 324/671 |
| 2016/0363543 | A1 * | 12/2016 | Georgeson | G01N 22/02 |
| 2017/0008094 | A1 * | 1/2017 | Nguyen | B23B 47/34 |
| 2017/0284947 | A1 * | 10/2017 | Hutchinson | G01N 23/04 |
| 2018/0140197 | A1 * | 5/2018 | Wang | A61B 5/0077 |
| 2018/0275081 | A1 * | 9/2018 | Brady | G01N 27/025 |
| 2018/0303446 | A1 * | 10/2018 | Schweizer | A61B 6/08 |
| 2019/0145909 | A1 * | 5/2019 | Georgeson | G01N 22/02 342/22 |
| 2019/0303721 | A1 * | 10/2019 | Kurtz | G06T 1/0014 |
| 2019/0367057 | A1 * | 12/2019 | Georgeson | B61L 27/57 |
| 2020/0151893 | A1 * | 5/2020 | Rennison | G06T 7/593 |
| 2021/0072166 | A1 * | 3/2021 | Uher | G06T 19/006 |
| 2021/0378100 | A1 * | 12/2021 | Criminale | H01L 21/68707 |
| 2021/0378119 | A1 * | 12/2021 | Criminale | H05K 5/069 |
| 2022/0214290 | A1 * | 7/2022 | Maeder | G01B 11/272 |

OTHER PUBLICATIONS

European Patent Office, Extended European Search Report in related application, No. EP21217578, May 27, 2022.

English language machine-generated translation of European Patent Application Publication No. EP2208963A1, Jul. 21, 2010.

English language machine-generated translation of Chinese Patent No. CN107831180B, Mar. 17, 2020.

Canadian Intellectual Property Office, examination report in related application, No. 3,144,361, Jan. 25, 2024.

* cited by examiner

METHODS AND APPARATUS FOR MEASURING FASTENER CONCENTRICITY

RELATED APPLICATION

The present application is a non-provisional of and claims priority to U.S. Provisional Patent Application No. 63/134,067, filed on Jan. 5, 2021, entitled "METHODS AND APPARATUS FOR MEASURING FASTENER CONCENTRICITY," the complete disclosure of which is incorporated by reference.

FIELD

The present disclosure relates generally to systems and methods for inspecting fasteners, and more particularly to systems and methods for measuring concentricity and flushness of fasteners installed in a part.

BACKGROUND

Assemblies such as aircraft may include hundreds or thousands fasteners, which typically require substantial time to inspect, to verify that the fasteners are installed properly. For example, proper installation of a fastener for a given assembly may require that the fastener is perpendicular to the surfaces it joins, such that fasteners installed too oblique to the surface would be considered inadequate. When fastener installation is automated using robots to drill, install, and fasten rivets, for example, the ability to perform in-process open hole inspection may be lost. Current inspection techniques to inspect such fasteners installed in automated processes are destructive in nature. For example, rivet surface measurement is done using manual probes that give point measurements after removing fasteners for inspection. Furthermore, these techniques tend to be time-consuming, costly, and not very repeatable due to being operator-dependent.

SUMMARY

Presently disclosed systems and methods may be configured to provide nondestructive, quick, and automated inspection of installed fasteners in an assembly, such as an aircraft component. Such systems and methods may be configured to measure fastener concentricity, fastener flushness with a surface, and/or detect the presence of foreign object debris.

In an example, a system for inspecting a fastener installed at least partially through a hole in a part may include an x-ray imaging system, a first camera device, a second camera device, a first support structure, and at least one processing unit. The x-ray imaging system may be oriented and configured to produce an x-ray image of the fastener. The first camera device may be positioned and oriented such that it is configured to produce a first image of the fastener from a first vantage point, and the second camera device may be positioned and oriented such that it is configured to produce a second image of the fastener from a second vantage point. The x-ray imaging system, the first camera device, and the second camera device may be coupled to the first support structure. The first support structure may be configured to support and position the first camera device and the second camera device relative to the part and the fastener such that a 3D image of the fastener can be created from the first image and the second image. The at least one processing unit may be configured to create the 3D image of the fastener from the first image and the second image, and may be further configured to inspect the fastener based on the x-ray image and the 3D image, to determine concentricity and/or flushness of the fastener.

Disclosed methods of inspecting a fastener installed at least partially through a hole in a part generally include creating an x-ray image of the fastener via an x-ray imaging system, and measuring concentricity of the fastener, using the x-ray image. Additionally or alternatively, disclosed methods may include creating a 3D image of the fastener using a first image of the fastener and a second image of the fastener, wherein the first image is taken from a first vantage point, via a first camera device, and wherein the second image is taken from a second vantage point, via a second camera device, and measuring flushness of the fastener using the 3D image. Computer readable media having non-transitory computer readable instructions that, when executed by a processing unit, cause the processing unit to perform the disclosed methods are also disclosed.

DESCRIPTION

Figure 1:
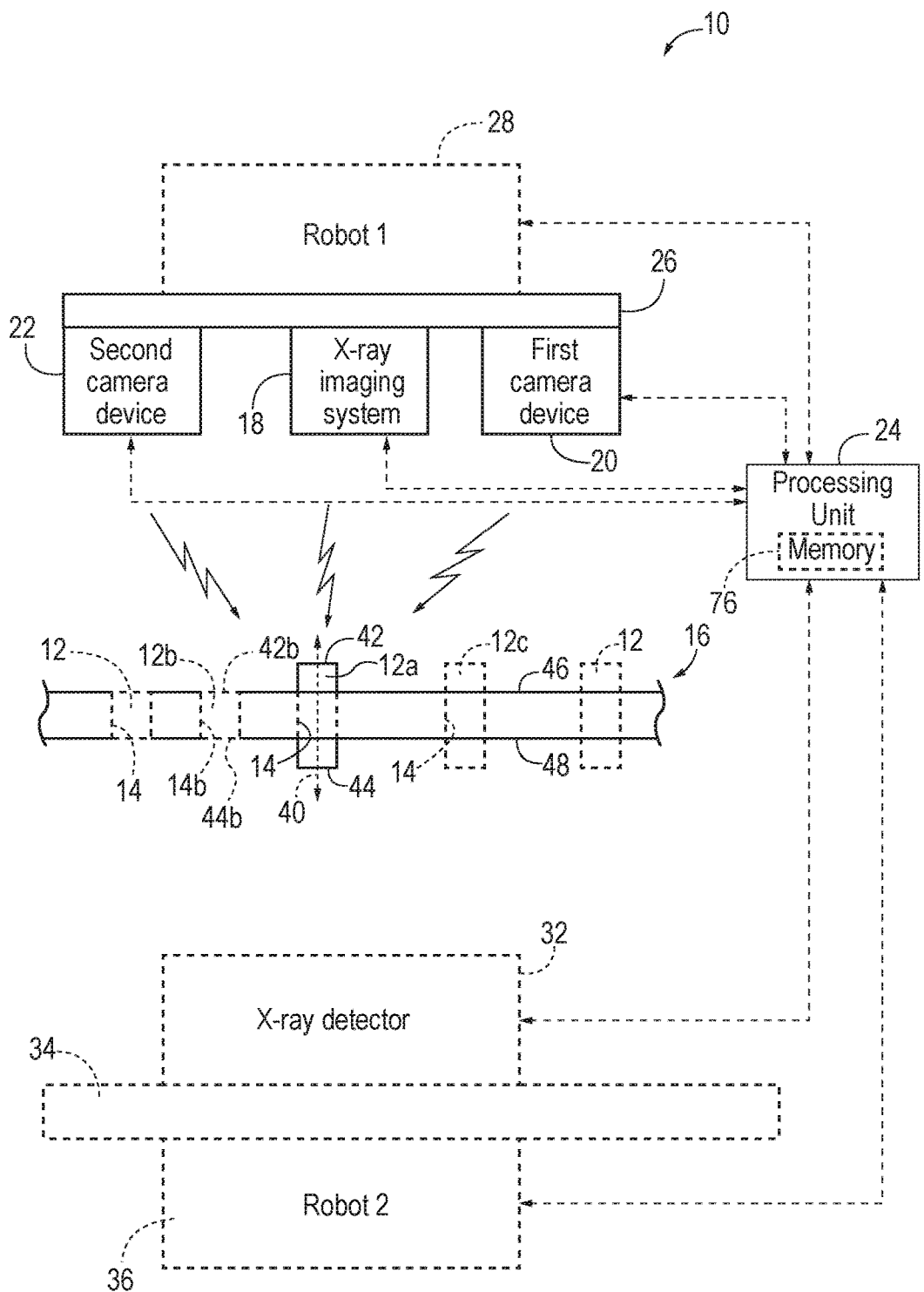
FIG. 1 is a schematic black box representation of examples of systems for inspecting fasteners, according to the present disclosure.
Figure 2:
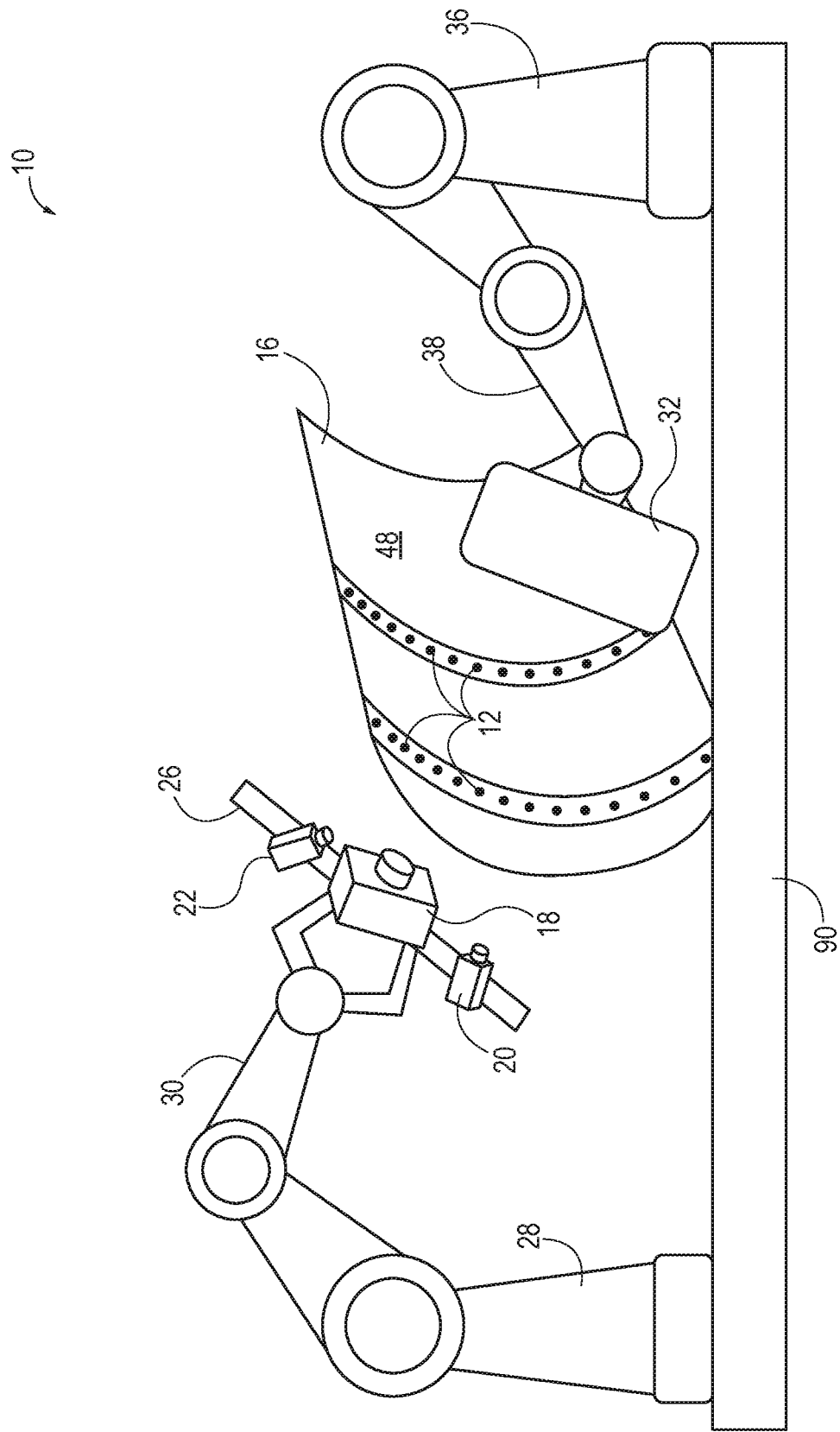
FIG. 2 is a schematic representation of an example of a system for inspecting fasteners, according to the present disclosure.
Figure 5:
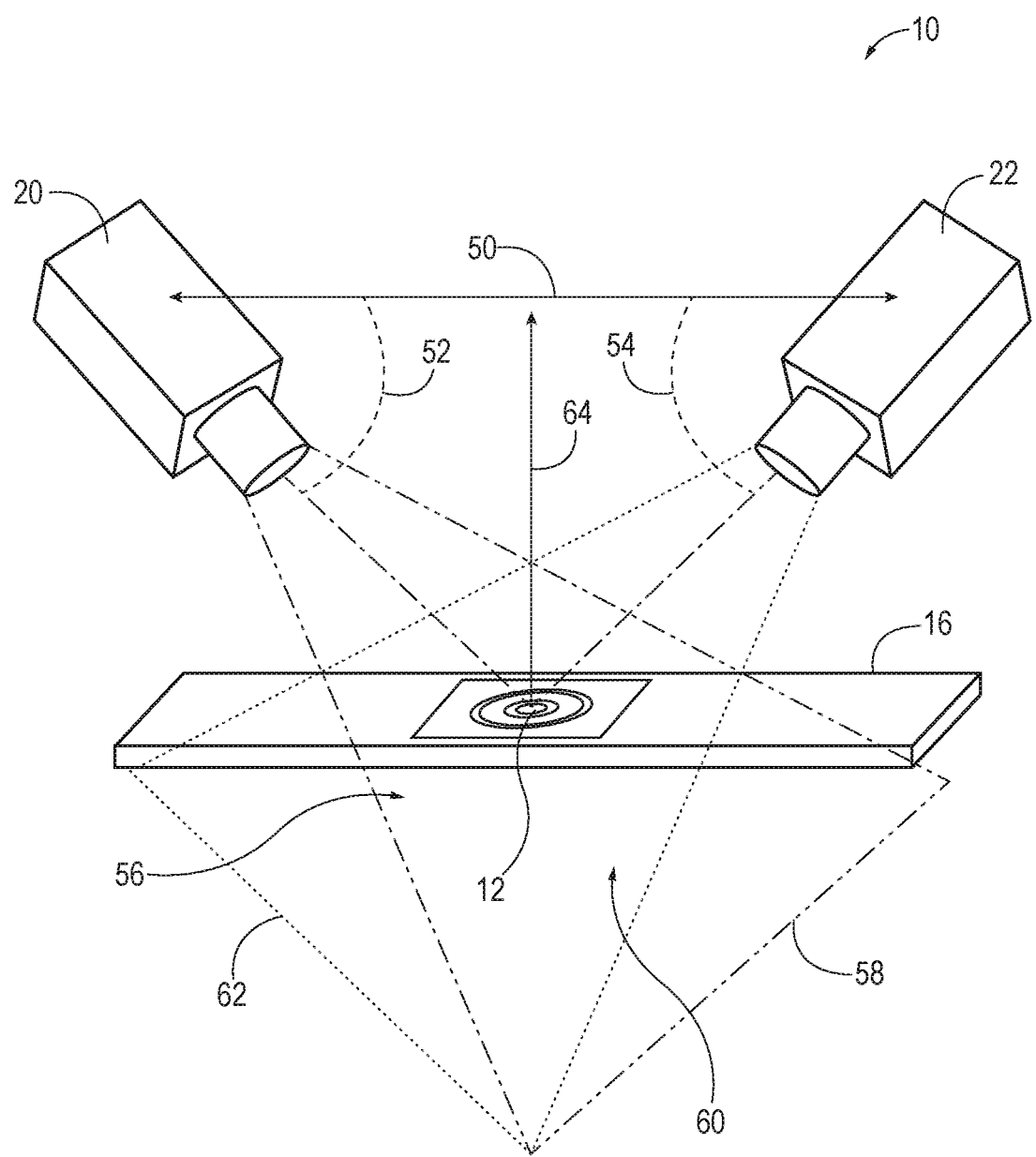
FIG. 5 is a schematic representation of the arrangement of first and second camera devices with respect to a fastener being inspected.

FIGS. 1, 2, and 5 provide illustrative, non-exclusive examples of systems 10 according to the present disclosure. Elements that serve a similar, or at least substantially similar, purpose are labeled with like numbers in each of FIGS. 1, 2, and 5, and these elements may not be discussed in detail herein with reference to each of FIGS. 1, 2, and 5. Similarly, all elements may not be labeled in each of FIGS. 1, 2, and 5, but reference numerals associated therewith may be utilized herein for consistency. Elements, components, and/or features that are discussed herein with reference to one or more of FIGS. 1, 2, and 5 may be included in and/or utilized with any of FIGS. 1, 2, and 5 without departing from the scope of the present disclosure. In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

With reference to FIGS. 1, 2, and 5, systems 10 are configured for inspecting one or more fasteners 12 installed at least partially through one or more respective holes 14 in a part 16. Examples will be described herein with reference to one or more fasteners 12 installed in an aircraft component (e.g., rivets in a wing panel). However, systems 10 may be used to inspect fasteners 12 installed in a wide variety of parts 16 from any industry, including but not limited to, the automotive, aerospace, marine, OEM, military, construction, transit, shipping, shelter, and cargo industries. Fasteners 12 may be configured to be at least substantially flush with one side of part 16, at least substantially flush with both sides of part 16, and/or may extend beyond one or both sides of part 16, as schematically represented in FIG. 1. Systems 10 are configured to inspect fasteners 12 non-destructively, meaning that fasteners 12 may be inspected without being damaged or removed from part 16. Systems 10 generally inspect fasteners 12 using a combination of radiography and image processing, combining computer vision and image processing algorithms for real-time detection and decision-making. Systems 10 further may be configured to inspect fastener 12 with only one-sided access to part 16, in some examples.

Systems 10 generally include an x-ray imaging system 18, a first camera device 20, and a second camera device 22. X-ray imaging system 18 is oriented and configured to produce an x-ray image of one or more fasteners 12 in part 16. In some examples, x-ray imaging system 18 may be configured to produce an x-ray image of a single fastener 12 (e.g., fastener 12a) at a time, and then may be moved with respect to part 16 to produce other x-ray images of other fasteners (e.g., fastener 12b). In some examples, x-ray imaging system 18 may be configured to produce an x-ray image that encompasses a plurality of fasteners in a single x-ray image (e.g., fasteners 12a, 12b, and 12c).

Similarly, first camera device 20 is positioned and oriented such that it is configured to produce a first image of one or more fasteners 12 in part 16, from a first vantage point. In some examples, first camera device 20 may be configured to produce a respective first image of a single fastener 12 (e.g., fastener 12a) at a time, and then may be moved with respect to part 16 to produce other first images of other fasteners (e.g., fastener 12b). In some examples, first camera device 20 may be configured to produce a first image that encompasses a plurality of fasteners in a single first image (e.g., fasteners 12a, 12b, and 12c). Likewise, second camera device 22 is positioned and oriented such that it is configured to produce a second image of one or more fasteners 12 in part 16, from a second vantage point. In some examples, second camera device 22 may be configured to produce a respective second image of a single fastener 12 (e.g., fastener 12a) at a time, and then may be moved with respect to part 16 to produce other second images of other fasteners (e.g., fastener 12b). In some examples, second camera device 22 may be configured to produce a second image that encompasses a plurality of fasteners in a single second image (e.g., fasteners 12a, 12b, and 12c).

Systems 10 also include at least one processing unit 24 configured to receive information (e.g., x-ray images, first images, and second images) from x-ray imaging system 18, first camera device 20, and second camera device 22. Said information may be transmitted to processing unit 24 wirelessly, or processing unit 24 may be directly electrically coupled to x-ray imaging system 18, first camera device 20, and/or second camera device 22. Processing unit 24 is configured to create a 3D image of one or more fasteners 12 from said information, such as using stereovision techniques. Processing unit 24 is configured to inspect fastener 12 based on the x-ray image received from x-ray imaging system 18, and/or based on the 3D image of fastener 12, as will be described in further detail herein.

Systems 10 also include a first support structure 26, to which x-ray imaging system 18, first camera device 20, and second camera device 22 are coupled. First support structure 26 is configured to support and position first camera device 20 and second camera device 22 relative to part 16 and the fastener 12 being inspected such that a 3D image of fastener 12 can be created from the first image produced by first camera device 20 and the second image produced by second camera device 22. Generally, first support structure 26 serves to position first camera device 20 and second camera device 22 such that first camera device 20 and second camera device 22 take images of fastener 12 from different angles, or vantage points. Support structure 26 generally supports x-ray imaging system 18 in a position in between first camera device 20 and second camera device 22, though systems 10 are not limited to this arrangement. In some examples, first support structure 26 may include two or more support structures that may be linked together or that may move independently of one another, for positioning x-ray imaging system 18, first camera device 20, and second camera device 22 with respect to part 16 and fastener 12.

First support structure 26 may be coupled to a first robot 28 that may be configured to control, orient, move, and/or position first support structure 26, such as via a first robot arm 30 (FIG. 2). First robot arm 30 may be configured to move first support structure 26 relative to part 16, thereby adjusting a position of x-ray imaging system 18, first camera device 20, and second camera device 22 relative to fastener 12. Systems 10 also may include an x-ray detector 32, which may be coupled to a second support structure 34 and/or a second robot 36 (e.g., via a second robot arm 38 as shown in FIG. 2). Second robot arm 38 may be configured to move second support structure 34 relative to part 16, thereby adjusting a position of x-ray detector 32 relative to fastener 12. As shown in FIGS. 1 and 2, x-ray imaging system 18 may be positioned on one side of part 16, while x-ray detector 32 may be positioned on the opposite side of part 16. Accordingly, first robot arm 30 may be positioned on one side of part 16, while second robot arm 38 may be positioned on the opposite side of part 16. In systems 10 including first robot 28 and second robot 36, first robot 28 may be a commander, primary, or leader robot, that dictates movement of second robot 36, which may be a secondary, or follower, robot. In some examples, first robot 28 and second robot 36 may be calibrated such that they move in tandem and with second robot arm 38 positioning x-ray detector 32 to face first support structure 26 and x-ray imaging system 18, as positioned by first robot arm 30, on the opposite side of part 16.

Systems 10 are configured to measure concentricity of one or more fasteners 12 and/or flushness of one or more fasteners 12 with respect to part 16. As used herein, "concentricity" of a fastener 12 refers to concentricity between two sides of the fastener, because fasteners 12 are configured to be perpendicular to part 16 when correctly installed in presently disclosed examples. Thus, when installed properly (i.e., such that a longitudinal axis 40 of fastener 12 is perpendicular to a plane defined by part 16), a circular plane defined by a first side 42 of fastener 12 is substantially concentric with a circular plane defined by a second side 44 of fastener 12. As used herein, concentricity between first side 42 and second side 44 of fastener 12 also generally indicates concentricity with respect to hole 14 in which fastener 12 is installed.

Figure 3:
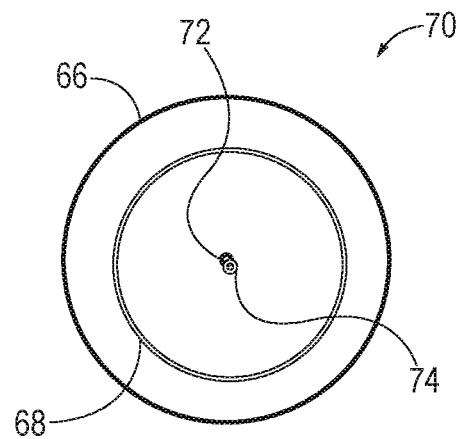
FIG. 3 is a top plan view of an example of a result from inspecting fastener concentricity, according to presently disclosed methods.
Figure 4:
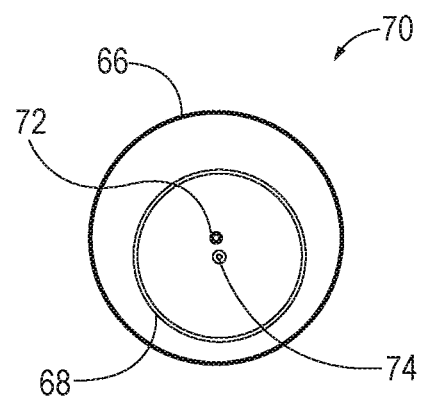
FIG. 4 is a top plan view of an example of a result from inspecting fastener concentricity, according to presently disclosed methods.

With reference to FIGS. 3-4, processing unit 24 (FIG. 1) may be configured to detect a first circle 66 and a second circle 68 from an x-ray image 70 of fastener 12. First circle 66 corresponds to first side 42 of fastener 12 (e.g., the head of fastener 12), while second circle 68 corresponds to second side 44 of fastener 12 (e.g., the shaft of fastener 12). For example, processing unit 24 may include instructions to detect circular features whose nominal diameter is that of fastener 12 (e.g., the head or shaft of fastener 12). Processing steps may include basic denoising (Gaussian blurring, median filter, etc.), Canny edge detection, and/or Hough Circle detection.

Figure 6:
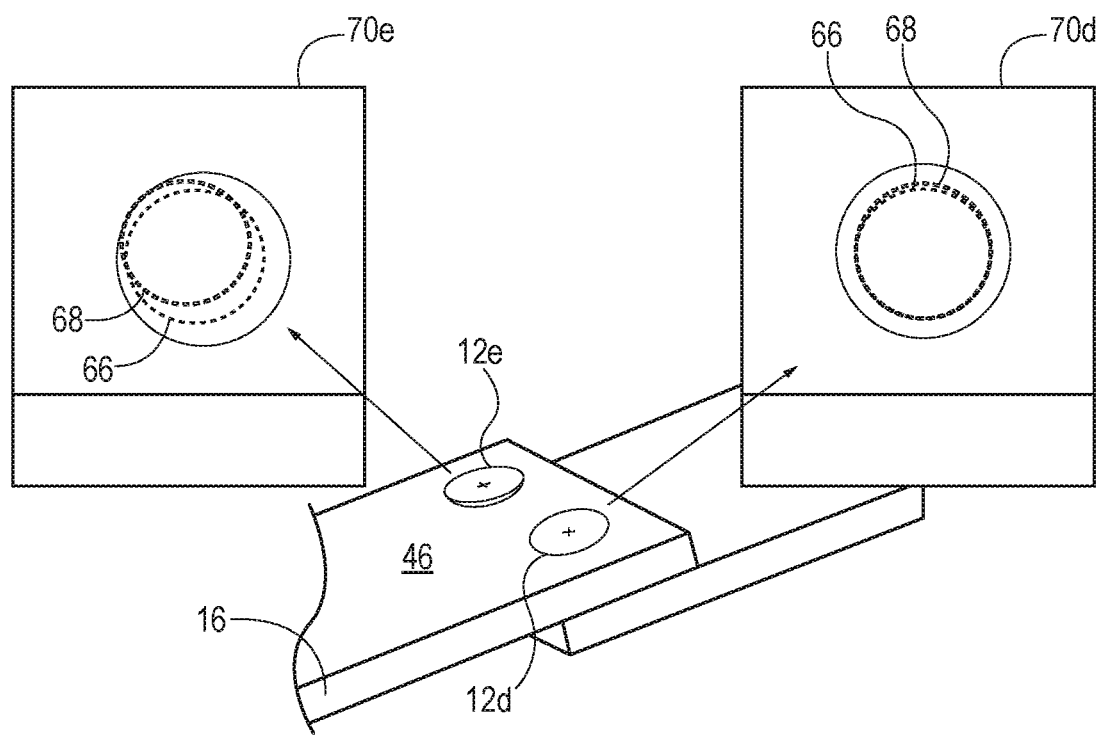
FIG. 6 illustrates results from inspecting two fasteners, illustrating one fastener that is adequately installed, and one that is inadequately installed.

Processing unit 24 is further configured to determine a first center 72 of first circle 66 and a second center 74 of second circle 68, and to determine the offset, or distance, between first center 72 and second center 74. Processing unit 24 may then determine whether the offset is within a predetermined pass/fail threshold offset distance. If first center 72 is farther from second center 74 than the predetermined pass/fail threshold offset distance, this may indicate that first circle 66 and second circle 68 are not sufficiently concentric, and therefore that fastener 12 is not adequately installed in part 16 because it is not sufficiently perpendicular to part 16. In other words, the greater the offset between first center 72 and second center 74, the more oblique fastener 12 may be with respect to part 16. FIG. 6 illustrates this concept in a different way, showing a fastener 12d that is adequately installed in part 16, whereas a fastener 12e is oblique to part 16, and thus inadequately installed. X-ray images 70 of each fastener 12d, 12e are also shown. For example, x-ray image 70d of fastener 12d illustrates that first circle 66 and second circle 68 are substantially concentric, which would correspond to a "pass" result for measuring concentricity of fastener 12b. On the other hand, x-ray image 70e of fastener 12e reveals that first circle 66 is significantly offset from second circle 68 (due to the obliqueness of fastener 12e with respect to part 16), and thus x-ray image 70e is an example of an image that would be interpreted as indicating an inadequately installed fastener, under certain threshold criteria. Fastener 12e accordingly may be indicated as inadequately installed and flagged for repair (e.g., reinstallation), removal, and/or replacement.

The predetermined threshold offset distance may be stored, for example, on a non-transitory computer readable memory 76 (also referred to herein as memory 76) (FIG. 1) of system 10. In this manner, system 10 may determine the quality of the installation of fastener 12, as determined by concentricity of the two sides 42, 44 of fastener 12. Processing unit 24 may include an x-ray image processing module for determining such concentricity of fastener 12. Systems 10 may be said to be configured to inspect first side 42 (also referred to herein as first portion 42) and second side 44 (also referred to herein as second portion 44) of fastener 12 at least substantially simultaneously, because x-ray imaging system 18 may be configured to create an x-ray image of both first side 42 and second side 44 of fastener 12 in a single x-ray image.

As used herein, "flushness" refers to the degree to which the fastener 12 protrudes beyond a surface of part 16, though systems 10 may be used to inspect fasteners 12 whether or not the fasteners are configured to be installed in hole 14 such that they are flush with part 16. In other words, in some examples, fastener 12 may be entirely within hole 14 when properly installed, while in other examples, at least a portion of fastener 12 may be positioned externally to hole 14 when fastener 12 is properly installed. For example, fastener 12b is installed completely in hole 14b in FIG. 1, such that first side, or first portion, 42b of fastener 12b is positioned adjacent a first surface 46 of part 16 and such that a second side, or second portion, 44b of fastener 12b is positioned adjacent a second surface 48 of part 16, with first surface 46 facing the first side of part 16 and second surface 48 facing the second side of part 16. On the other hand, first side 42 and second side 44 of fastener 12a are positioned externally to its hole 14, such that they protrude beyond first surface 46 and second surface 48, respectively, of part 16.

In some examples, system 10 is configured to inspect a height of a head of fastener 12 with respect to first surface 46 and/or second surface 48 of part 16, thereby measuring flushness of fastener 12. Processing unit 24 may include a 3D reconstruction module configured to determine flushness of fastener 12 by creating the 3D image of fastener 12 and the surface of part 16. For example, once the 3D image of the fastener 12 is created from two or more images of fastener 12, a point cloud of the 3D surface may be generated by processing unit 24. Based on the 3D image, processing unit 24 may be configured to identify a surface of fastener 12 (e.g., the surface corresponding to first side 42), and to identify a surface of part 16 (e.g., first surface 46). Processing unit 24 may then be configured to fit a first plane to the surface of fastener 12, and to fit a second plane to the surface of part 16, in order to determine a height difference between the first plane and the second plane, thereby measuring flushness of fastener 12 with respect to first surface 46 of part 16. One or more filters may be applied by processing unit 24 to the point cloud of the 3D surface of fastener 12 to identify the two surfaces, in some examples.

Additionally or alternatively, systems 10 may be configured to detect foreign object debris around fastener 12, such as debris generated during installation of fastener 12. Processing unit 24 may include a 2D processing module configured to detect foreign object debris around fastener 12. In some examples of system 10, processing unit 24 may be configured to identify objects with a surface area that is dissimilar to that of the head of fastener 12, using image processing techniques (e.g., image classification algorithms), and based on the x-ray image of fastener 12, the 3D reconstruction of fastener 12 and/or part 16, and/or 2D images of fastener 12 and/or part 16. For example, processing unit 24 may be configured to detect circular features having a diameter matching a known diameter of a head of fastener 12, and to apply high pass filtering to eliminate background, and thereby detect any foreign object debris adjacent, or in the vicinity of, fastener 12.

Memory 76 of processing unit 24 may store non-transitory computer readable instructions that, when executed by processing unit 24, cause processing unit 24 to measure concentricity of fastener 12, measure flushness of fastener 12 with respect to part 16, and/or detect foreign object debris near fastener 12. Threshold pass/fail criteria for fastener inspections may be stored on memory 76. Furthermore, the instructions, when executed by processing unit 24, may be configured to cause processing unit 24 to automatically mark, indicate, or flag any detected defective fasteners 12.

Systems 10 may be configured to inspect a plurality of fasteners 12 installed in part 16, while first robot 28 may be configured to scan part 16 as the plurality of fasteners 12 are inspected, in order to determine contours of part 16. In this manner, processing unit 24 may determine movement of first robot arm 30, based on the scan of part 16, in order to position x-ray imaging system 18, first camera device 20, and second camera device 22 relative to the respective fastener 12 of the plurality of fasteners being inspected. In some examples, first support structure 26 is configured to be moved with respect to part 16 in between subsequent respective fastener inspections, such that x-ray imaging system 18, first camera device 20, and second camera device 22 are correctly positioned and oriented with respect to each respective fastener 12 being inspected. Second robot 36 may be configured to synchronously scan the part, along with first robot 28, as the plurality of fasteners 12 are inspected, in order to determine contours of part 16, thereby determining movement of second robot arm 38 to position x-ray detector 32 relative to the respective fastener 12 of the plurality of fasteners being inspected, or relative to first support structure 26.

As shown in FIG. 2, commander robot 28 and/or follower robot 36 may be positioned on a sliding motion stage 90. Sliding motion stage 90 may be configured to slide, or translate, within a workspace environment in order to position first robot 28 and second robot 36 to examine fasteners 12 in a plurality of different, spaced apart, parts 16. Additionally or alternatively, sliding motion stage 90 may be configured to allow for movement of first robot 28 and/or second robot 36 with respect to part 16, such that systems 10 may be positioned and oriented as desired for inspecting fasteners 12.

Figure 7:
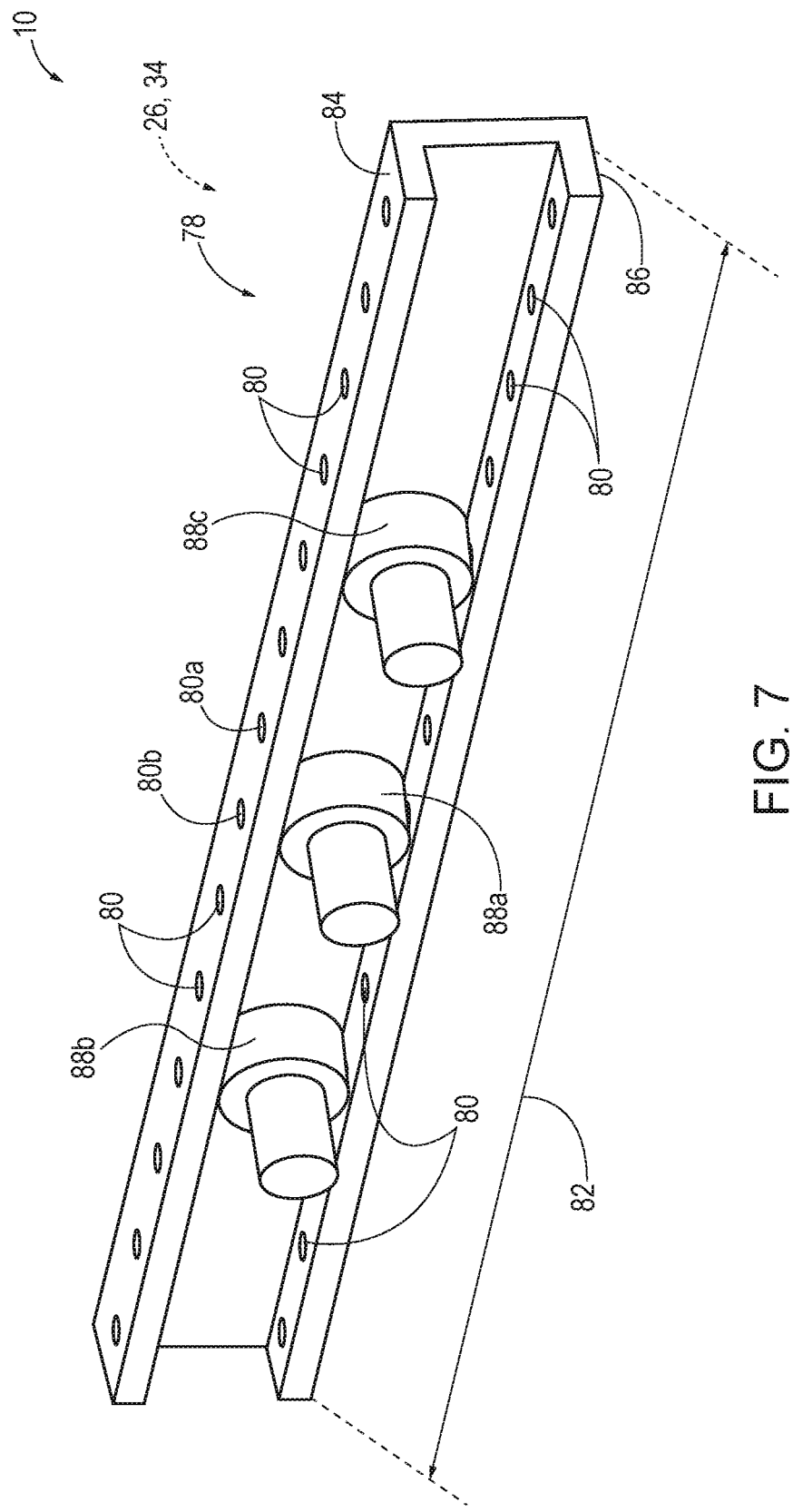
FIG. 7 is a perspective view of one example of a support structure of presently disclosed systems.

First support structure 26 may be, or include, a first rigid linear platform, in some systems 10. For example, first support structure 26 may be, or include, a C-beam railing. Similarly, second support structure 34 may be, or include, a second rigid linear platform, such as a C-beam railing. An example of a structure that may serve as first support structure 26 and/or second support structure 34 is illustrated in FIG. 7. X-ray imaging system 18, first camera device 20, and second camera device 22 may be coupled to first support structure 26 collinearly.

With continued reference to FIGS. 1, 2, and 5, X-ray imaging system 18 is a portable, mobile, and/or handheld x-ray imaging system 18 in some examples, though generally x-ray imaging system 18 may be any x-ray system configured to produce x-ray images of fastener 12. First camera device 20 and/or second camera device 22 may be first and second pinhole cameras in some examples, though generally first camera device 20 and second camera device 22 may be any camera device configured to produce images of fastener 12. System 10 in general may be portable and mounted on various robot arms in different work cells or locations.

Systems 10 may be configured to automatically mark, or indicate, defectively installed or unsatisfactorily installed fasteners, if any are deemed unsatisfactory as a result of inspection. Such fasteners that fail inspection may be flagged for manual inspection and/or for removal from part 16. In some examples, systems 10 may be configured to inspect each fastener 12 in a given part 16. In other examples, systems 10 may be configured to inspect just a subset of fasteners 12 in a given part 16, though said systems 10 may be configured to inspect additional fasteners 12 in the vicinity of a defectively installed fastener. First robot arm 30 also may be used to install fasteners 12 in part 16, and systems 10 may thus inspect such fasteners 12 in real-time, as they are installed. Systems 10 also may be configured for automated examination of x-ray images produced by x-ray imaging system 18, such that fastener concentricity may be determined in real-time, at the time the fastener is installed.

As noted above, x-ray imaging system 18 may be positioned between first camera device 20 and second camera device 22. In some examples, first camera device 20 and second camera device 22 are symmetrically positioned on either side of x-ray imaging system 18, such that first camera device 20 and second camera device 22 may be at least substantially equidistant from x-ray imaging system 18. Additionally or alternatively, first camera device 20 and second camera device 22 may be symmetrically positioned on either side of the center of hole 14 of fastener 12 being inspected.

With reference to FIG. 5, a distance 50 between first camera device 20 and second camera device 22, a first angle 52 of first camera device 20 with respect to first support structure 26 (FIG. 2), and/or a second angle 54 of second camera device 22 with respect to first support structure 26 may be selectively adjusted to position fastener 12 within a first central region 56 of a first field of view 58 of first camera device 20 and within a second central region 60 of a second field of view 62 of second camera device 22. Distance 50 between first camera device 20 and second camera device 22 (and/or angles 52 and 54) may be chosen such that fastener 12 is positioned at the center of first field of view 58 and second field of view 62. In some examples, distance 50 may be about 6 inches, about 8 inches, about 10 inches, about 12 inches, about 16 inches, about 20 inches, about 24 inches, about 28 inches, about 32 inches, about 36 inches, and/or greater than 36 inches. Distance 50 may vary depending on the size of part 16, the size of fastener 12, and/or first angle 52 and second angle 54. First angle 52 and second angle 54 may be at least substantially equal in some examples. In other examples, first angle 52 may be different from second angle 54. First angle 52 and/or second angle 54 may be about 45 degrees in some examples. In other examples, first angle 52 and/or second angle 54 may be between 0-45 degrees, between 45-90 degrees, between 90-135 degrees, and/or between 135-180 degrees.

Additionally or alternatively, a first standoff distance 64 between first support structure 26 and fastener 12 may be optimized for both stereographs and radiographs. For example, first standoff distance 64 may be at least 6 inches, at least 8 inches, at least 10 inches, at least 12 inches, at least 14 inches, at least 16 inches, at least 18 inches, and/or at least 20 inches. In a specific example, first standoff distance 64 may be between 12-16 inches. First standoff distance 64 may be selected or set relative to distance 50 between first camera device 20 and second camera device 22, in view of first angle 52 and second angle 54. First standoff distance 64 may be less than distance 50, such as about 75% of distance 50, about 50% of distance 50, and/or about 25% of distance 50. In some examples, first standoff distance 64 may be between 25-75% of distance 50. In other examples, first standoff distance 64 may be greater than distance 50. Additionally or alternatively, a second standoff distance between x-ray detector 32 (FIG. 2) and fastener 12 may be selectively adjusted according to a desired geometric magnification of the x-ray image produced by x-ray imaging system 18. First standoff distance 64 may be selectively adjusted via movement of first robot arm 30, while the second standoff distance may be selectively adjusted via movement of second robot arm 38 (FIG. 2).

Generally, system 10 includes processing unit 24, where, in operation, processing unit 24 executes computer-readable instructions (stored on a memory 76 of processing unit 24) to fasteners 12 in order to detect any fasteners that are unsatisfactorily installed, in which case processing unit 24 may automatically indicate the fastener or fasteners that failed inspection. Accordingly, system 10 may serve as an automated, real-time fastener installation and inspection system. In a specific example, an onboard processing unit 24 such as Raspberry Pi can be used to provide various commands, data collection, and to perform the analysis of fasteners 12. Processing unit 24 may be positioned on board first robot 28, coupled to support structure 26, and/or on board second robot 36. In other examples, processing unit 24 may be positioned remotely from first robot 28 and second robot 36. Processing unit 24 may be integrated into first robot 28 and/or second robot 36 at the time of manufacture. In other examples, first robot 28 and/or second robot 36 may be outfitted (e.g., retrofit) with processing unit 24 after its initial manufacture.

Turning now to FIG. 7, illustrative non-exclusive examples of first support structure 26 and/or second support structure 34, in the form of a C-beam railing 78 are illustrated. Where appropriate, the reference numerals from the schematic illustrations of FIGS. 1, 2, and 5 are used to designate corresponding parts in FIG. 7 however, the examples of FIGS. 1, 2, and 5 are non-exclusive and do not limit first support structure 26 or second support structure 34 to the illustrated example of FIG. 7. That is, first support structure 26 and second support structure 34 are not limited to the illustrated C-beam railing 78 and may incorporate any number of the various aspects, configurations, characteristics, properties, etc. of first support structure 26 or second support structure 34 that are illustrated in and discussed with reference to the schematic representations of FIG. 1, 2, or 5, and/or the example of FIG. 7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to C-beam railing 78; however, it is within the scope of the present disclosure that the previously discussed features, variants, etc. may be utilized therewith.

FIG. 7 illustrates an example of first support structure 26 and/or second support structure 34, in the form of a C-beam railing 78. C-beam railing 78 includes a plurality of holes 80 spaced apart along a length 82 of C-beam railing 78. For example, C-beam railing 78 may include a plurality of holes 80 along a first, or upper lip, or flange, 84 and along a second, or lower lip, or flange, 86. One or more of holes 80 may be threaded, in some examples. Holes 80 may be said to include a first plurality of holes 80 along upper lip 84 and a second plurality of holes 80 along lower lip 86, with the respective holes 80 being spaced relative to one another on upper lip and lower lip 84, 86 respectively, such that set screws may be inserted through one or more holes 80 on upper lip 84 and one or more holes 80 on lower lip 86 to limit or restrict movement of x-ray imaging system 18, first camera device 20, and/or second camera device 22, via rings 88. Rings 88 may be configured to linearly translate such that they slide longitudinally along length 82 of C-beam railing 78, unless a set screw (or bolt, post, pin, etc.) is inserted through holes 80 to prevent such sliding movement of rings 88. For example, a first set screw inserted through hole 80a and a second set screw inserted through hole 80b may substantially limit or prevent linear translation of ring 88a along C-beam railing 78.

In some examples, x-ray imaging system 18 may be coupled to one of rings 88 (e.g., ring 88a), first camera device 20 may be coupled to one of rings 88 (e.g., ring 88b), and second camera device 22 may be coupled to one of rings 88 (e.g., ring 88c). In this manner, linear translation of rings 88 thereby causes movement of the device coupled to the respective ring 88. In some examples, the angle and position of x-ray imaging system 18 may be adjusted with respect to fastener 12 via ring 88a. Similarly, the angle and position of first camera device 20 may be adjusted with respect to fastener 12 via ring 88b, and the angle and position of second camera device 22 may be adjusted with respect to fastener 12 via ring 88c. When moving first camera device 20 and/or second camera device 22 (and/or when changing the focus of first camera device 20 and/or second camera device 22, systems 10 may be configured to allow for correction of lens distortion and for calibration of first camera device 20 and/or second camera device 22 (e.g., calibration for pixels-to-inches conversion). For example, calibration of first camera device 20 and/or second camera device 22 may be performed using one or more images of a standard check-board pattern and a calibration module stored on processing unit 24. Similarly, when moving x-ray imaging system 18, x-ray parameters may be set to optimize image quality of resulting x-ray images. For example, image quality indicators may be placed on part 16 and/or fastener 12 to verify x-ray image quality.

Figure 8:
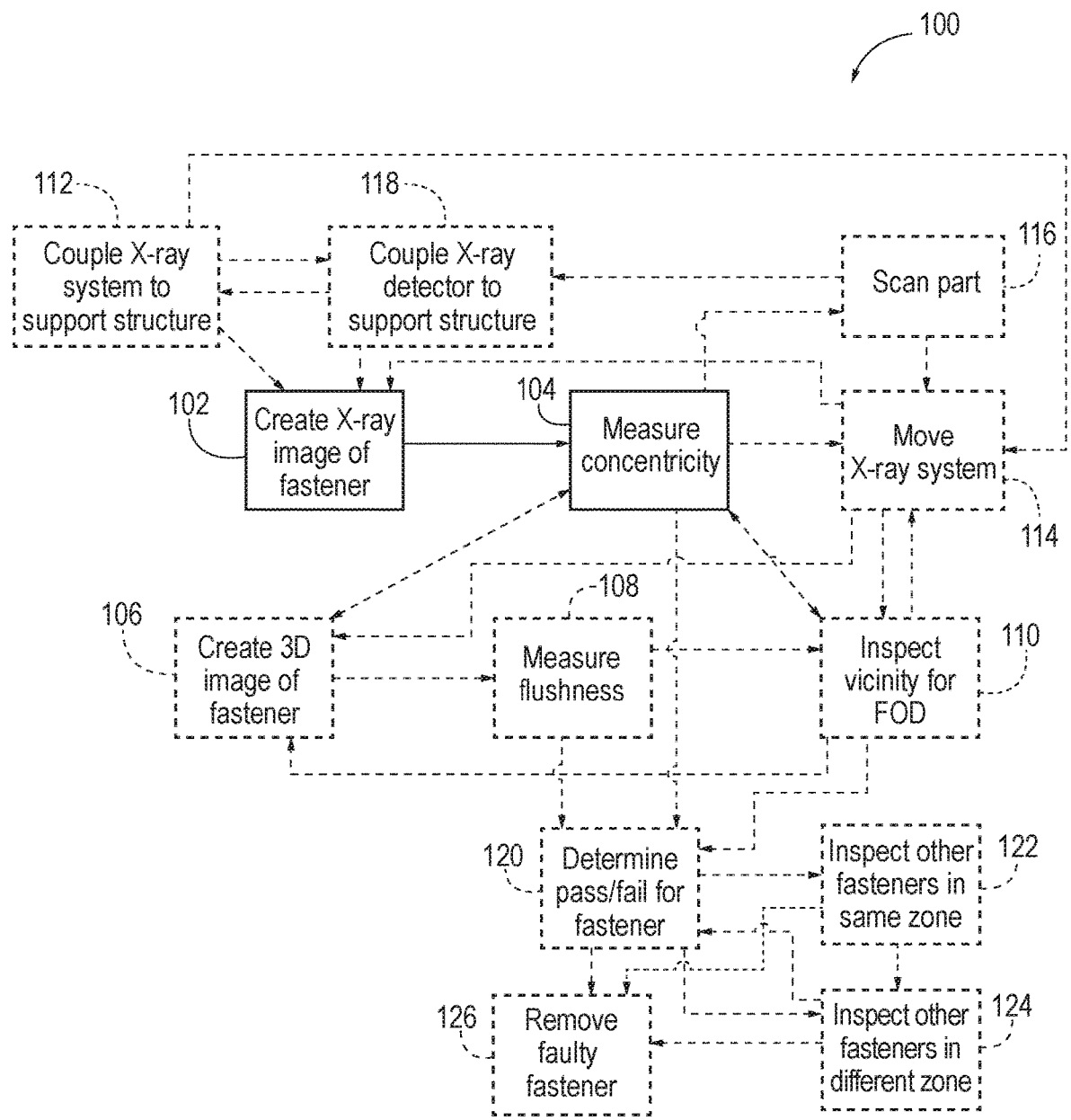
FIG. 8 is a schematic flowchart diagram illustrating presently disclosed methods of inspecting installed fasteners.
Figure 9:
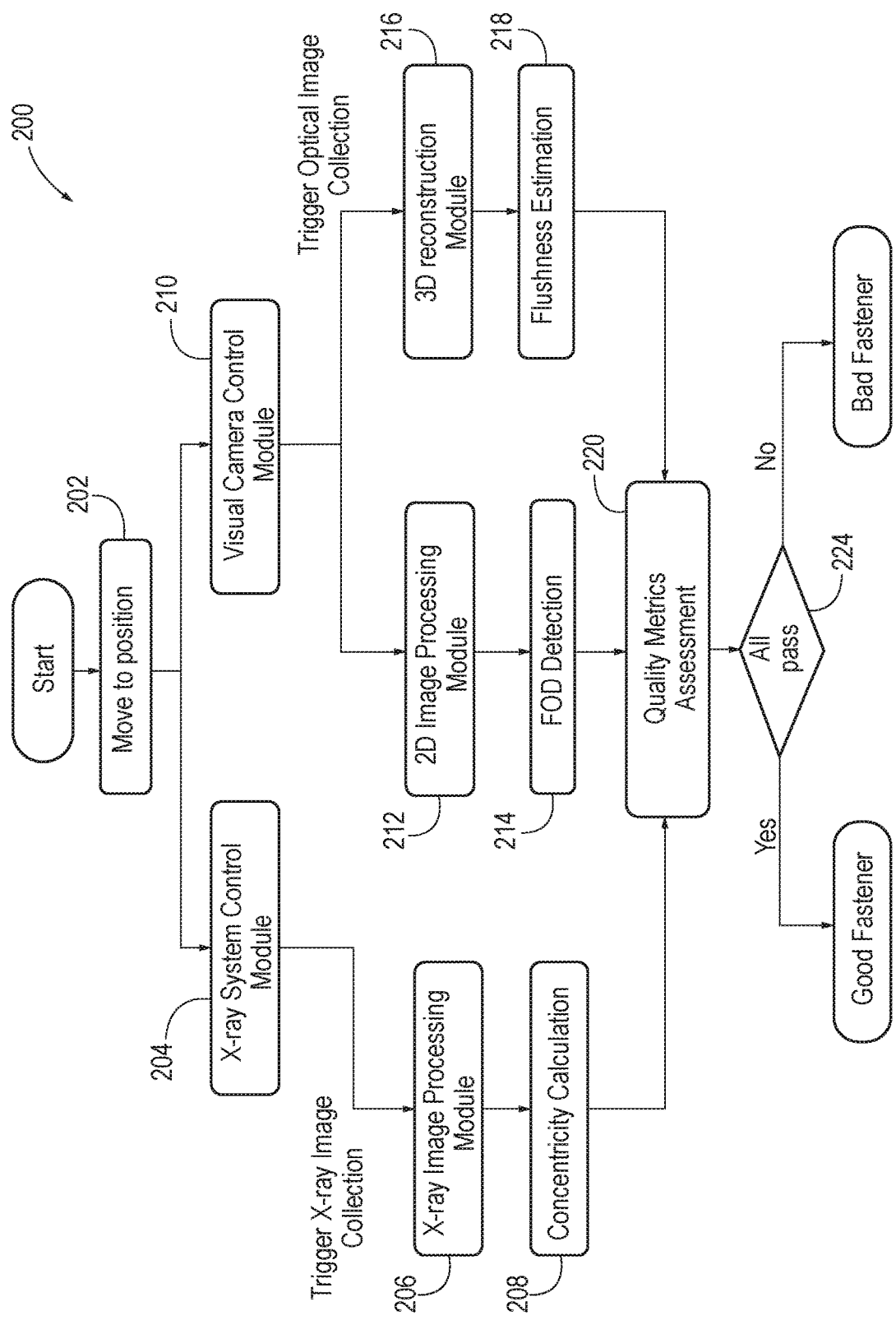
FIG. 9 is a schematic flowchart diagram illustrating a decision tree for inspecting installed fasteners.

FIGS. 8-9 schematically provide flowcharts that represent illustrative, non-exclusive examples of methods according to the present disclosure. In FIGS. 8-9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 8-9 are not limiting and other methods and steps are within the scope of the present disclosure, including methods having greater than or fewer than the number of steps illustrated, as understood from the discussions herein.

FIG. 8 illustrates methods 100 of inspecting a fastener (e.g., fastener 12) installed at least partially through a hole in a part (e.g., hole 14 of part 16). Methods 100 generally include creating an x-ray image of the fastener via an x-ray imaging system (e.g., x-ray imaging system 18), at 102, and measuring concentricity of the fastener using the x-ray image, at 104. Measuring concentricity at 104 may be performed by one or more processing units (e.g., processing unit 24). Measuring concentricity at 104 may include detecting a first circle corresponding to a first side of the fastener (e.g., a head of the fastener, such as first side 42), detecting a second circle corresponding to a second side of the fastener (e.g., a shaft of the fastener, such as second side 44), determining a first center of the first circle (e.g., first center 72 of first circle 66), determining a second center of the second circle (e.g., second center 74 of second circle 68), and determining an offset distance between the first center and the second center. Measuring concentricity at 104 also may include determining whether the offset distance is within a predetermined pass/fail threshold offset distance and/or indicating whether the offset distance is within the predetermined pass/fail threshold offset distance for each fastener inspected.

Methods 100 may include determining whether a particular fastener is pass/fail (e.g., whether it is installed adequately, overall, for the requirements or installation criteria of the fastener), at 120. For example, if the measuring concentricity at 104 indicated that the offset distance is not within the predetermined pass-fail threshold offset distance, then that may be sufficient criteria for a "fail" determination at step 120. The determining pass/fail for a given fastener at 120 generally includes determining whether the fastener is installed adequately for the given circumstances, and may be based on measuring concentricity at 104, measuring flushness at 108, and/or inspecting for foreign object debris at 110. In some examples, the determining pass/fail for a given fastener at 120 includes performing a quality threshold calculation.

The determining pass/fail for a fastener at 120 may including indicating which fasteners have been installed adequately and/or which fasteners are inadequately installed. For example, an inadequately installed fastener may be indicated at 120 by recording or noting the location of the inadequately installed fastener, by physically marking the inadequately installed fastener, by alerting an operator of the inadequately installed fastener, by recording or noting an identification number or other identifier of the inadequately installed fastener, and/or by any other means of indicating that a particular fastener is not installed adequately. In some methods 100, after determining that a respective fastener is installed unsatisfactorily at 120, the respective fastener may be removed from the part at 126, and the respective fastener may be replaced with a new fastener installed in the part.

Methods 100 also may include creating a 3D image, or 3D reconstruction, of the fastener using a first image of the fastener and a second image of the fastener, at 106. The first image of the fastener is taken from a first vantage point (e.g., by first camera device 20), and the second image of the fastener is taken from a second vantage point (e.g., by second camera device 22). The 3D image of the fastener may be created at 106 by the processing unit, using stereovision, structured light projection, laser scanning, and/or any other suitable technique. For example, the creating the 3D image of the fastener at 106 may include capturing two images of the fastener (e.g., via first camera device and second camera device), reconstructing a 3D surface of the fastener, and generating a point cloud of the 3D surface using stereo vision techniques. Additionally or alternatively, the creating the 3D image of the fastener at 106 may include calibrating the first camera device and the second camera device relative to one another and relative to the fastener such that the first camera device and the second camera device are configured to take images configured to create a 3D reconstruction of the fastener installed in the part.

Flushness of the fastener with a surface of the part may be measured by the processing unit, using the 3D image of the fastener, at 108. For example, the measuring flushness of a fastener at 108 may include identifying a first surface of the fastener, identifying a second surface of the part, fitting a first plane to the first surface, fitting a second plane to the second surface, and determining a height difference between the first plane and the second plane, thereby measuring flushness of the fastener. One or more filters may be applied to a point cloud of the 3D surface of the fastener to identify the first surface and/or the second surface.

Additionally or alternatively, a vicinity of the fastener may be inspected for foreign object debris at 110. For example, the detecting foreign object debris at 110 may include identifying objects with a surface area that is dissimilar to that of the head of the fastener, using image processing techniques (e.g., image classification algorithms), and based on the x-ray image of the fastener, the 3D reconstruction of the fastener and part surface, and/or 2D images of the fastener and part surface. In a specific example, the inspecting for foreign object debris at 110 may include applying image processing to detect circular features having a diameter matching a known diameter of a head of the fastener, applying high pass filtering to eliminate background, and thereby detecting any foreign object debris adjacent, or in the vicinity of, the fastener.

In some methods 100, the x-ray imaging system may be coupled to a first support structure (e.g., first support structure 26), at 112. The coupling the x-ray imaging system to the first support structure at 112 also may include coupling the first camera device and/or the second camera device to the first support structure as well. The x-ray imaging system may be moved and/or positioned with respect to the part and/or fastener at 114, along with the first and second camera devices, such as by coupling the first support structure to a robot arm and moving the robot arm to position the x-ray imaging system, the first camera device, and the second camera device relative to the fastener and the part. Some methods 100 may include scanning the part at 116 before the moving and/or positioning the x-ray imaging system at 114, with the scan of the part informing the movement of the robot arm and thereby the movement of the x-ray imaging system. The scanning the part at 116 may include determining contours of the part and planning movement of the first robot arm to position the x-ray imaging system relative to a respective fastener of a plurality of fasteners being inspected. In some methods 100, the scanning the part at 116 may be performed in tandem with the measuring concentricity at 104, the measuring flushness at 108, and/or the inspecting for foreign object debris at 110. For example, the processing unit of disclosed systems may be determining concentricity at the current location, while another region of the part is being scanned in preparation for measuring concentricity at the next location of the subsequent fastener to be measured.

Methods 100 may include positioning the x-ray imaging system on a first side of the part via the moving the x-ray imaging system at 114, and also coupling an x-ray detector (e.g., x-ray detector 32) to a second support structure at 118 and positioning the x-ray detector on the opposite side of the part from the x-ray imaging system. Coupling and positioning the x-ray detector at 118 may include selectively adjusting a stand-off distance between the x-ray detector and the part, based on, for example, the desired geometric magnification of the x-ray image. The second support structure may be coupled to a second robot arm, such as one coupled to a second robot, which may thereby control movement of the x-ray detector relative to the part and the fastener (and relative to the first robot arm and the x-ray imaging system). The second robot may be a follower robot to a commander robot controlling movement of the first support structure. In this manner, the two robot arms may be configured to move in a coordinated manner such that the x-ray imaging system and x-ray detector are positioned relative to each other and relative to the fastener to create an x-ray image of the fastener as described herein.

In some methods 100, the flushness, concentricity, and/or presence of foreign object debris is measured or detected for a plurality of fasteners in a given part. In other words, the measuring concentricity at 104, the measuring flushness at 108, and/or the inspecting a fastener vicinity for foreign object debris at 110 may be performed a plurality of times, such as being performed for each fastener being inspected. In these examples, methods 100 may include the moving and/or positioning the x-ray imaging system at 114 between each performance of the measuring concentricity at 104, the measuring flushness at 108, and/or the inspecting a fastener vicinity for foreign object debris at 110. For example, concentricity of a first fastener may be measured at 104, flushness of the first fastener may be measured at 108, and/or the first fastener may be inspected for foreign object debris in its vicinity at 110, and then the x-ray imaging system may be moved and/or positioned at 114 before measuring concentricity of a second fastener may be measured at 104, flushness of the second fastener may be measured at 108, and/or the second fastener may be inspected for foreign object debris in its vicinity at 110.

Fasteners may be inspected on a zone basis, in some methods 100. For example, a part having a plurality of fasteners may be divided into two or more different zones, with each zone having a plurality of fasteners therein. When inspecting fasteners in a part, disclosed systems may inspect a predetermined number of fasteners (one or more) within a given zone, rather than every fastener in the zone. If the inspected fastener or fasteners in a zone are adequately installed, the system may move on to a different zone and inspect one or more fasteners in that zone, at 124. If, on the other hand, one or more fasteners in a given zone are found to be inadequately installed, then one or more other fasteners in the same zone may be inspected, beyond the original number of fasteners inspected, at 122. In this manner, disclosed systems may inspect a sample of fasteners in a part, and increase the sampling in areas, or zones, where one or more fasteners is determined to be inadequately installed. Thus, the measuring concentricity at 104 may include measuring concentricity of a first fastener in a first zone of the part and measuring concentricity of a second fastener within a second zone of the part. The measuring concentricity at 104 may include measuring concentricity of at least one fastener in each of a plurality of zones of the part.

Non-transitory computer readable instructions for performing the measuring concentricity at 104, the moving and/or positioning the x-ray system at 114, the scanning the part at 116, the creating the 3D image of the fastener at 106, the measuring flushness at 108, the inspecting for foreign object debris at 110, and/or the determining a pass/fail status of the fastener at 120 may be stored on a computer readable medium and/or on the memory of the processing unit of disclosed systems, and that may be executed by the processing unit of systems. FIG. 9 schematically illustrates an example algorithm 200 that may be executed by processing unit 24 and stored on memory 76, in order to inspect one or more fasteners 12 installed in part 16. Briefly, the system may be positioned with respect to the fastener being inspected, as indicated by move to position at 202. An x-ray system control module of the processing unit may be activated at 204 to trigger x-ray image collection of the faster. An x-ray image processing module of the processing unit may be activated at 206 to perform a concentricity calculation at 208. Whether in parallel or in series, a visual camera control module of the processing unit may be activated at 210 to trigger optical image collection by the first and second camera devices. A 2D image processing module of the processing unit may be activated at 212 to perform foreign object debris detection at 214, and a 3D reconstruction module of the processing unit may be activated at 216 to perform flushness estimation at 218. Quality metric assessment may be performed by the processing unit at 220 to determine whether a given fastener being inspected has passed all metrics that were measured, at 224. If all the measured metrics have a "pass" result, then the inspected fastener is deemed adequately installed, whereas if one or more of the measured metrics have a "fail" result, then the inspected fastener is deemed inadequately installed, and flagged for removal or repair.

Illustrative, non-exclusive examples of inventive subject matter according to the present disclosure are described in the following enumerated paragraphs:

A1. A system (10) for inspecting a fastener (12) installed at least partially through a hole (14) in a part (16), the system (10) comprising:
an x-ray imaging system (18) oriented and configured to produce an x-ray image (70) of the fastener (12);
a first camera device (20) positioned and oriented such that it is configured to produce a first image of the fastener (12) from a first vantage point;
a second camera device (22) positioned and oriented such that it is configured to produce a second image of the fastener (12) from a second vantage point;
a first support structure (26) to which the x-ray imaging system (18), the first camera device (20), and the second camera device (22) are coupled, wherein the first support structure (26) is configured to support and position the first camera device (20) and the second camera device (22) relative to the part (16) and the fastener (12) such that a 3D image of the fastener (12) can be created from the first image and the second image; and
at least one processing unit (24) configured to create the 3D image of the fastener (12) from the first image and the second image, wherein the at least one processing unit (24) is further configured to inspect the fastener (12) based on the x-ray image (70) and the 3D image.

A1.1. The system (10) of paragraph A1, wherein the system (10) is configured to measure concentricity of the fastener (12).

A1.2. The system (10) of paragraph A1 or A1.1, wherein the system (10) is configured to measure flushness of the fastener (12) with respect to the part (16).

A2. The system (10) of any of paragraphs A1-A1.2, further comprising an x-ray detector (32), wherein the x-ray imaging system (18) is positioned on a first side of the part (16), wherein the x-ray detector (32) is positioned on a second side of the part (16) such that the x-ray imaging system (18) and the x-ray detector (32) are on opposite sides of the part (16).

A3. The system (10) of paragraph A2, wherein the x-ray detector (32) is coupled to a second support structure (34).

A4. The system (10) of any of paragraphs A1-A3, wherein the first support structure (26) comprises a first rigid linear platform.

A4.1. The system (10) of any of paragraphs A1-A4, wherein the first support structure (26) comprises a C-beam railing (78).

A4.2. The system (10) of any of paragraphs A1-A4.1, wherein the first support structure (26) comprises a plurality of holes (14) spaced apart along a length of the first support structure (26).

A4.3. The system (10) of paragraph A4.2, wherein the plurality of holes (14) comprises a plurality of threaded holes (14).

A4.4. The system (10) of paragraph A4.2 or A4.3, wherein the plurality of holes (14) comprises a first plurality of holes (14) spaced apart along a first lip (84) of the first support structure (26), wherein the plurality of holes (14) comprises a second plurality of holes (14) spaced apart along a second lip (86) of the support structure, and wherein the first plurality of holes (14) is spaced relative to the second plurality of holes (14) such that set screws inserted through one or more of the first plurality of holes (14) and one or more of the second plurality of holes (14) may be configured to limit or restrict movement of the x-ray imaging system (18), the first camera device (20), and/or the second camera device (22).

A5. The system (10) of any of paragraphs A1-A4.4, wherein a/the second support structure (34) comprises a second rigid linear platform.

A5.1. The system (10) of any of paragraphs A1-A5, wherein a/the second support structure (34) comprises a second C-beam railing (78).

A5.2. The system (10) of any of paragraphs A1-A5.1, wherein a/the second support structure (34) comprises a plurality of holes (14) spaced apart along a length of the second support structure (34).

A6. The system (10) of any of paragraphs A1-A5.2, wherein the first support structure (26) is coupled to a first robot arm (30).

A7. The system (10) of paragraph A6, wherein the first robot arm (30) is configured to move the first support structure (26) relative to the part (16), thereby adjusting a position of the x-ray imaging system (18), the first camera device (20), and the second camera device (22) relative to the fastener (12).

A7.1. The system (10) of paragraph A7, wherein the first robot arm (30) is coupled to a commander robot (28).

A7.2. The system (10) of paragraph A7.1, wherein the commander robot (28) is positioned on a sliding motion stage (90).

A7.3. The system (10) of paragraph A7.1 or A7.2, wherein the system (10) is configured to inspect a plurality of fasteners (12) installed in the part (16), wherein the commander robot (28) is configured to scan the part (16) as the plurality of fasteners (12) are inspected, in order to determine contours of the part (16), thereby determining movement of the first robot arm (30) to position the x-ray imaging system (18), the first camera device (20), and the second camera device (22) relative to the respective fastener (12) of the plurality of fasteners (12) being inspected.

A7.4. The system (10) of any of paragraphs A1-A7.3, wherein the system (10) is configured to inspect a/the plurality of fasteners (12) installed in the part (16), wherein the first support structure (26) is configured to be moved with respect to the part (16) in between subsequent respective fastener (12) inspections, such that the x-ray imaging system (18), the first camera device (20), and the second camera device (22) are correctly positioned and oriented with respect to each respective fastener (12) being inspected.

A8. The system (10) of any of paragraphs A1-A7.4, wherein a/the second support structure (34) is coupled to a second robot arm (38).

A9. The system (10) of paragraph A8, wherein the second robot arm (38) is configured to move the second support structure (34) relative to the part (16), thereby adjusting a position of a/the x-ray detector (32) relative to the fastener (12).

A9.1. The system (10) of paragraph A9, wherein the second robot arm (38) is coupled to a follower robot (36).

A9.2. The system (10) of paragraph A9.1, wherein the follower robot (36) is positioned on a/the sliding motion stage (90).

A9.3. The system (10) of paragraph A9.1 or A9.2, wherein the system (10) is configured to inspect a/the plurality of fasteners (12) installed in the part (16), wherein the follower robot (36) is configured to synchronously scan the part (16), along with a/the commander robot (28), as the plurality of fasteners (12) are inspected, in order to determine contours of the part (16), thereby determining movement of the second robot arm (38) to position the x-ray detector (32) relative to the respective fastener (12) of the plurality of fasteners (12) being inspected, or relative to the first support structure (26).

A10. The system (10) of any of paragraphs A1-A9.3, wherein a/the first robot arm (30) is positioned on a/the first side of the part (16), and wherein a/the second robot arm (38) is positioned on a/the second side of the part (16).

A11. The system (10) of any of paragraphs A1-A10, wherein the part (16) comprises a panel.

A12. The system (10) of any of paragraphs A1-A11, wherein the fastener (12) is installed completely through the hole (14) such that a first portion of the fastener (12) is positioned adjacent a first surface (46) of the part (16) and such that a second portion of the fastener (12) is positioned adjacent a second surface (48) of the part (16), wherein the first surface (46) faces a/the first side of the part (16), and wherein the second surface (48) faces a/the second side of the part (16).

A12.1. The system (10) of paragraph A12, wherein the system (10) is configured to inspect the first portion of the fastener (12) and the second portion of the fastener (12) at least substantially simultaneously.

A13. The system (10) of any of paragraphs A1-A12.1, wherein the system (10) is configured to inspect the fastener (12) non-destructively.

A14. The system (10) of any of paragraphs A1-A13, wherein the system (10) is configured to detect fastener (12) concentricity, fastener (12) orientation, and foreign object debris generated during installation of the fastener (12).

A14.1. The system (10) of any of paragraphs A1-A14, wherein the system (10) is configured to inspect a height of a head of the fastener (12) with respect to a/the first surface (46) of the part (16) and/or with respect to a/the second surface (48) of the part (16).

A15. The system (10) of any of paragraphs A1-A14.1, wherein the system (10) is configured to inspect the fastener (12) with only one-sided access to the part (16).

A16. The system (10) of any of paragraphs A1-A15, wherein the x-ray imaging system (18) comprises a portable, mobile, and/or handheld x-ray imaging system (18).

A17. The system (10) of any of paragraphs A1-A16, wherein the first camera device (20) comprises a first pinhole camera.

A18. The system (10) of any of paragraphs A1-A17, wherein the second camera device (22) comprises a second pinhole camera.

A19. The system (10) of any of paragraphs A1-A18, wherein the system (10) is configured such that a first angle (52) and/or a first position of the x-ray imaging system (18) with respect to the fastener (12) may be selectively adjusted via one or more rings (88) and/or one or more set screws operatively coupled to the first support structure (26).

A19.1. The system (10) of any of paragraphs A1-A19, wherein the x-ray imaging system (18) is coupled to one or more rings (88), wherein the one or more rings (88) are configured to linearly translate along the first support structure (26), and wherein the one or more rings (88) are configured to be held in place via one or more set screws.

A20. The system (10) of any of paragraphs A1-A19.1, wherein the system (10) is configured such that a second angle (54) and/or a second position of the first camera device (20) with respect to the fastener (12) may be selectively adjusted via the one or more rings (88) and/or the one or more set screws operatively coupled to the first support structure (26).

A20.1. The system (10) of any of paragraphs A1-A20, wherein the first camera device (20) is coupled to one or more rings (88), wherein the one or more rings (88) are configured to linearly translate along the first support structure (26), and wherein the one or more rings (88) are configured to be held in place via one or more set screws.

A21. The system (10) of any of paragraphs A1-A20.1, wherein the system (10) is configured such that a third angle and/or a third position of the second camera device (22) with respect to the fastener (12) may be selectively adjusted via the one or more rings (88) and/or the one or more set screws operatively coupled to the first support structure (26).

A21.1. The system (10) of any of paragraphs A1-A21, wherein the second camera device (22) is coupled to one or more rings (88), wherein the one or more rings (88) are configured to linearly translate along the first support structure (26), and wherein the one or more rings (88) are configured to be held in place via one or more set screws.

A22. The system (10) of any of paragraphs A1-A21.1, wherein the x-ray imaging system (18) is positioned in between the first camera device (20) and the second camera device (22).

A23. The system (10) of any of paragraphs A1-A22, wherein the first camera device (20) and the second camera device (22) are symmetrically positioned on either side of the x-ray imaging system (18).

A24. The system (10) of any of paragraphs A1-A23, wherein the first camera device (20) and the second camera device (22) are symmetrically positioned on either side of a center line of the hole (14).

A25. The system (10) of any of paragraphs A1-A24, wherein the system (10) is configured such that a distance between the first camera device (20) and the second camera device (22), a first angle (52) of the first camera device (20) with respect to the first support structure (26), and a second angle (54) of the second camera device (22) with respect to the second support structure (34) may be selectively adjusted to position the fastener (12) within a first central region (56) of a first field of view (58) of the first camera device (20) and within a second central region (60) of a second field of view (62) of the second camera device (22).

A26. The system (10) of any of paragraphs A1-A25, wherein a first stand-off distance between the first support structure (26) and the fastener (12) is optimized for both stereographs and radiographs.

A27. The system (10) of any of paragraphs A1-A26, wherein the first stand-off distance is at least 6 inches, at least 8 inches, at least 10 inches, at least 12 inches, at least 14 inches, at least 16 inches, at least 18 inches, and/or at least 20 inches.

A28. The system (10) of any of paragraphs A1-A27, wherein the first stand-off distance is between 12-16 inches.

A29. The system (10) of any of paragraphs A1-A28, wherein the system (10) is configured such that a second stand-off distance between a/the x-ray detector (32) is configured to be selectively adjusted according to a desired geometric magnification of the x-ray image (70).

A30. The system (10) of any of paragraphs A1-A29, wherein the system (10) is configured to automatically mark defective fasteners (12) if inspection of the fastener (12) is not satisfactory.

A31. The system (10) of any of paragraphs A1-A30, wherein the x-ray imaging system (18), the first camera device (20), and the second camera device (22) are coupled to the first support structure (26) collinearly.

A32. The system (10) of any of paragraphs A1-A31, wherein a/the first robot arm (30) is configured to install the fastener (12) in the part (16), and wherein the system (10) is configured to inspect the fastener (12) in real-time.

A33. The system (10) of any of paragraphs A1-A32, wherein the system (10) is configured for automated examination of the x-ray image (70) to determine concentricity of the fastener (12).

A34. The system (10) of any of paragraphs A1-A33, wherein the at least one processing unit (24) is configured to detect a first circle (66) corresponding to a first side (42) of the fastener (12) and a second circle (68) corresponding to a second side (44) of the fastener (12), and wherein the at least one processing unit (24) is further configured to determine a first center (72) of the first circle (66) and a second center (74) of the second circle (68) and determine an offset distance between the first center (72) and the second center (74).

A35. The system (10) of paragraph A34, wherein the at least one processing unit (24) is configured to determine whether the offset distance is within a predetermined pass/fail threshold offset distance.

A35.1. The system (10) of paragraph A35, wherein the predetermined pass/fail threshold offset distance is stored on non-transitory computer readable memory (76) of the system (10).

A36. The system (10) of any of paragraphs A1-A35.1, wherein the at least one processing unit (24) is configured to determine a quality of installation of the fastener (12).

A37. The system (10) of any of paragraphs A1-A36, wherein the at least one processing unit (24) comprises an x-ray imaging processing module configured to determine concentricity of the fastener (12).

A38. The system (10) of any of paragraphs A1-A37, wherein the at least one processing unit (24) comprises a 2D processing module configured to detect foreign object debris around the fastener (12).

A39. The system (10) of any of paragraphs A1-A38, wherein the at least one processing unit (24) comprises a 3D reconstruction module configured to determine flushness of the fastener (12) with the part (16).

A40. The system (10) of any of paragraphs A1-A39, further comprising a memory (76) storing non-transitory computer readable instructions that, when executed by the at least one processing unit (24), cause the at least one processing unit (24) to measure concentricity of the fastener (12), measure flushness of the fastener (12) with respect to the part (16), and/or detect foreign object debris near the fastener (12).

A41. The system (10) of paragraph A40, wherein threshold pass/fail criteria for the fastener (12) are stored on the memory (76).

A42. The system (10) of paragraph A40 or A41, wherein the instructions, when executed by the at least one processing unit (24), cause the at least one processing unit (24) to automatically mark any detected defective fasteners (12).

B1. A method (100) of inspecting a fastener (12) installed at least partially through a hole (14) in a part (16), the method (100) comprising:
creating (102) an x-ray image (70) of the fastener (12) via an x-ray imaging system (18); and
measuring (104) concentricity of the fastener (12), using the x-ray image (70).

B2. The method (100) of paragraph B1, wherein the measuring (104) concentricity is performed by at least one processing unit (24).

B3. The method (100) of paragraph B1 or B2, further comprising creating (106) a 3D image of the fastener (12) using a first image of the fastener (12) and a second image of the fastener (12), wherein the first image is taken from a first vantage point, via a first camera device (20), and wherein the second image is taken from a second vantage point, via a second camera device (22).

B4. The method (100) of paragraph B3, wherein the creating (106) the 3D image of the fastener (12) is performed by at least one processing unit (24).

B5. The method (100) of paragraph B3 or B4, further comprising measuring (108) flushness of the fastener (12), using the 3D image.

B6. The method (100) of paragraph B5, wherein the measuring (108) flushness is performed by at least one processing unit (24).

B7. The method (100) of any of paragraphs B1-B6, further comprising inspecting (110) a vicinity of the fastener (12) for foreign object debris.

B8. The method (100) of any of paragraphs B1-B7, further comprising coupling (112) the x-ray imaging system (18), a/the first camera device (20), and a/the second camera device (22) to a first support structure (26).

B9. The method (100) of paragraph B8, further comprising moving the first support structure (26) relative to the fastener (12), via a first robot arm (30).

B10. The method (100) of any of paragraphs B1-B9, further comprising:
positioning the x-ray imaging system (18) on a first side of the part (16); and
positioning an x-ray detector (32) on a second side of the part (16), such that the x-ray imaging system (18) and the x-ray detector (32) are on opposite sides of the part (16).

B11. The method (100) of paragraph B10, further comprising coupling (118) the x-ray detector (32) to a second support structure (34).

B12. The method (100) of paragraph B11, further comprising moving the second support structure (34) relative to the fastener (12), via a second robot arm (38).

B13. The method (100) of any of paragraphs B1-B12, further comprising:
performing the measuring (104) concentricity of the fastener (12) a plurality of times to measure concentricity of a plurality of fasteners (12) of the part (16); and
moving the x-ray imaging system (18) relative to the part (16) between each performance of the measuring (104) concentricity.

B14. The method (100) of any of paragraphs B1-B13, further comprising scanning (116) the part (16), thereby determining contours of the part (16) and planning movement of a/the first robot arm (30) to position the x-ray imaging system (18) relative to a respective fastener (12) of a/the plurality of fasteners (12) being inspected.

B14.1. The method (100) of paragraph B14, wherein the scanning (116) the part (16) is performed in tandem with the measuring (104) concentricity of the fastener (12).

B15. The method (100) of any of paragraphs B1-B14.1, wherein the measuring (104) concentricity is performed non-destructively.

B16. The method (100) of any of paragraphs B1-B15, wherein the measuring (104) concentricity comprises:
detecting a first circle (66) corresponding to a first side (42) of the fastener (12);
detecting a second circle (68) corresponding to a second side (44) of the fastener (12);
determining a first center (72) of the first circle (66);
determining a second center (74) of the second circle (68); and
determining an offset distance between the first center (72) and the second center (74).

B17. The method (100) of paragraph B16, further comprising determining whether the offset distance is within a predetermined pass/fail threshold offset distance.

B18. The method (100) of paragraph B17, further comprising indicating the fastener (12) is defective if the offset distance is not within the predetermined pass/fail threshold offset distance.

B19. The method (100) of any of paragraphs B1-B18, wherein the method (100) is performed using the system (10) of any of paragraphs A1-A42.

B20. The method (100) of any of paragraphs B1-B19, further comprising calibrating a/the first camera device (20) and a/the second camera device (22) relative to one another and relative to the fastener (12) such that the first camera device (20) and the second camera device (22) are configured to take images configured to create a 3D reconstruction of the fastener (12) installed in the part (16).

B21. The method (100) of any of paragraphs B1-B20, wherein the measuring (104) concentricity of the fastener (12) comprises measuring concentricity of a first fastener (12) in a first zone of the part (16), and wherein the method (100) further comprises measuring concentricity of a second fastener (12) in a second zone of the part (16).

B22. The method (100) of any of paragraphs B1-B21, wherein the measuring (104) concentricity of the fastener (12) comprises measuring concentricity of at least one fastener (12) in each of a plurality of zones of the part (16).

B23. The method (100) of paragraph B22, wherein the measuring (104) concentricity comprises measuring concentricity of additional fasteners (12) within a respective zone of the plurality of zones if a different fastener (12) within the respective zone is determined to be defective.

B24. The method (100) of any of paragraphs B1-B23, further comprising selectively adjusting a stand-off distance between an/the x-ray detector (32) and the part (16), based on desired geometric magnification of the x-ray image (70).

B25. The method (100) of any of paragraphs B1-B24, further comprising:
determining (120) that a respective fastener (12) of the part (16) is installed unsatisfactorily;

removing (126) the respective fastener (12) from the part (16); and replacing the respective fastener (12) with a new fastener (12) installed in the part (16).

B26. The method (100) of any of paragraphs B1-B25, further comprising creating a 3D reconstruction of the fastener (12) installed in the part (16).

B27. The method (100) of paragraph B26, wherein the creating the 3D reconstruction comprises stereo imaging with a/the first camera device (20) and a/the second camera device (22).

B28. The method (100) of paragraph B26 or B27, wherein the creating the 3D reconstruction comprises structured light projection.

B29. The method (100) of any of paragraph B26-B28, wherein the creating the 3D reconstruction comprises laser scanning.

B30. The method (100) of any of paragraphs B1-B29, further comprising:

capturing two images of the fastener (12);

reconstructing a 3D surface of the fastener (12); and generating a point cloud of the 3D surface using stereo vision techniques.

B31. The method (100) of any of paragraphs B1-B30, further comprising:

identifying a first surface of the fastener (12);

identifying a second surface (48) of the part (16);

fitting a first plane to the first surface;

fitting a second plane to the second surface (48); and determining a height difference between the first plane and the second plane, thereby measuring (108) flushness of the fastener (12).

B32. The method (100) of paragraph B31, wherein the identifying the first surface comprises applying one or more filters to a/the point cloud of a/the 3D surface of the fastener (12).

B33. The method (100) of paragraph B31 or B32, wherein the identifying the second surface comprises applying one or more filters to a/the point cloud of a/the 3D surface of the part (16).

B34. The method (100) of any of paragraphs B1-B33, further comprising:

applying image processing to detect circular features having a diameter matching a known diameter of a head of the fastener (12);

applying high pass filtering to eliminate background; and detecting foreign object debris adjacent the fastener (12).

B35. The method (100) of paragraph B34, wherein the detecting foreign object debris comprises identifying objects with a surface area that is dissimilar to that of the head of the fastener (12).

C1. A computer readable medium, comprising:

non-transitory computer readable instructions that, when executed by a processing unit (24), cause the processing unit (24) to perform the method (100) of any of paragraphs B1-B35.

C2. A computer readable medium, comprising:

non-transitory computer readable instructions that, when executed by a processing unit (24), cause the processing unit (24) to measure concentricity of a fastener (12) installed in a part (16), using an x-ray image (70) of the fastener (12).

C3. The computer readable medium of paragraph C2, wherein the non-transitory computer readable instructions, when executed by the processing unit (24), further cause the processing unit (24) to:

create a 3D reconstruction of a fastener (12) installed in a part (16), using a first image of the fastener (12) and a second image of the fastener (12); and measure flushness of the fastener (12) with a surface of the part (16), using the 3D reconstruction.

C4. The computer readable medium of paragraph C2 or C3, wherein the non-transitory computer readable instructions, when executed by the processing unit (24), further cause the processing unit (24) to detect foreign object debris in a vicinity of the fastener (12).

D1. The use of the system (10) of any of paragraphs A1-A42 to measure concentricity of a fastener (12) with a hole (14) in which the fastener (12) is installed.

D2. The use of the system (10) of any of paragraphs A1-A42 to measure flushness of a fastener (12) with a surface of part (16) in which the fastener (12) is installed.

D3. The use of the system (10) of any of paragraphs A1-A42 to detect foreign object debris near a fastener (12) installed in a part (16).

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

A processing unit may be any suitable device or devices that are configured to perform the functions of the processing unit discussed herein. For example, the processing unit may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. Additionally or alternatively, the processing unit may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A system for inspecting a fastener installed at least partially through a hole in a part, the system comprising:
   an x-ray imaging system oriented and configured to produce an x-ray image of the fastener;
   a first camera device positioned and oriented such that it is configured to produce a first image of the fastener from a first vantage point, wherein the first camera device is positioned and oriented such that the fastener is within a first central region of a first field of view of the first camera device;
   a second camera device positioned and oriented such that it is configured to produce a second image of the fastener from a second vantage point, wherein the second camera device is positioned and oriented such that the fastener is within a second central region of a second field of view of the second camera device, and wherein the first camera device and the second camera device are positioned and oriented with respect to one another such that the first field of view overlaps with the second field of view;
   a first support structure to which the x-ray imaging system, the first camera device, and the second camera device are coupled, wherein the first support structure is configured to support and position the first camera device and the second camera device relative to the part and the fastener such that a 3D image of the fastener can be created from the first image and the second image; and
   at least one processing unit configured to create the 3D image of the fastener from the first image and the second image, wherein the at least one processing unit is further configured to inspect the fastener based on the x-ray image and the 3D image, and wherein the system is configured to measure concentricity of the fastener with respect to the hole based on the x-ray image and the 3D image.

2. The system according to claim 1, wherein the system is configured to measure flushness of the fastener with respect to the part, using the 3D image of the fastener.

3. The system according to claim 1, wherein the first support structure is coupled to a first robot arm of a commander robot, wherein the first robot arm is configured to move the first support structure relative to the part, thereby adjusting a position of the x-ray imaging system, the first camera device, and the second camera device relative to the fastener.

4. The system according to claim 3, wherein the system is configured to inspect a plurality of fasteners installed in the part, wherein the commander robot is configured to scan the part as the plurality of fasteners are inspected, in order to determine contours of the part, thereby determining movement of the first robot arm to position the x-ray imaging system, the first camera device, and the second camera device relative to a respective fastener of the plurality of fasteners being inspected, and wherein the first support structure is configured to be moved with respect to the part in between subsequent respective fastener inspections via movement of the first robot arm.

5. The system according to claim 3, wherein the first robot arm is configured to install the fastener in the part, and wherein the system is configured to inspect the fastener in real-time.

6. The system according to claim 1, further comprising an x-ray detector, wherein the x-ray imaging system is positioned on a first side of the part, wherein the x-ray detector is positioned on a second side of the part such that the x-ray imaging system and the x-ray detector are on opposite sides of the part, wherein the x-ray detector is coupled to a second support structure, wherein the second support structure is coupled to a second robot arm, and wherein the second robot arm is configured to move the second support structure relative to the part, thereby adjusting a position of the x-ray detector relative to the fastener.

7. The system according to claim 1, wherein the system is configured to inspect the fastener non-destructively.

8. The system according to claim 1, wherein the system is further configured to detect foreign object debris generated during installation of the fastener.

9. The system according to claim 1, wherein the x-ray imaging system comprises a portable x-ray imaging system, wherein the first camera device comprises a first pinhole camera, wherein the second camera device comprises a second pinhole camera, and wherein the system is configured such that a first angle and a first position of the x-ray imaging system with respect to the fastener may be selectively adjusted via its coupling to the first support structure.

10. The system according to claim 1, wherein the first support structure comprises a C-beam railing comprising:
a first plurality of holes spaced apart along a first lip of the first support structure; and
a second plurality of holes spaced apart along a second lip of the first support structure, wherein the first plurality of holes is spaced relative to the second plurality of holes such that set screws inserted through one or more of the first plurality of holes and one or more of the second plurality of holes may be configured to limit or restrict movement of the x-ray imaging system, the first camera device, and the second camera device.

11. The system according to claim 10, wherein the x-ray imaging system is coupled to one or more rings, wherein the one or more rings are configured to linearly translate along the first support structure, and wherein the one or more rings are configured to be held in place via one or more set screws inserted through one or more of the first plurality of holes and one or more of the second plurality of holes, wherein the first camera device is configured to linearly translate along the first support structure, wherein the second camera device is configured to linearly translate along the first support structure, and wherein the x-ray imaging system is positioned in between the first camera device and the second camera device.

12. The system according to claim 1, wherein the at least one processing unit is configured to detect a first circle corresponding to a first side of the fastener and a second circle corresponding to a second side of the fastener, and wherein the at least one processing unit is further configured to determine a first center of the first circle and a second center of the second circle and determine an offset distance between the first center and the second center, and wherein the at least one processing unit is configured to determine whether the offset distance is within a predetermined pass/fail threshold offset distance.

13. The system according to claim 1, further comprising a memory storing non-transitory computer readable instructions that, when executed by the at least one processing unit, cause the at least one processing unit to measure concentricity of the fastener, measure flushness of the fastener with respect to the part, and detect any foreign object debris near the fastener, and wherein the memory storing non-transitory computer readable instructions, when executed by the at least one processing unit, further cause the at least one processing unit to automatically mark any detected defective fasteners.

14. A method of inspecting a fastener installed at least partially through a hole in a part, the method comprising:
creating an x-ray image of the fastener via an x-ray imaging system;
measuring concentricity of the fastener, using the x-ray image, wherein the measuring concentricity is performed by at least one processing unit;
positioning and orienting a first camera device such that the fastener is within a first central region of a first field of view of the first camera device;
positioning and orienting a second camera device such that the fastener is within a second central region of a second field of view of the second camera device, wherein the first field of view overlaps with the second field of view;
creating a 3D image of the fastener using a first image of the fastener and a second image of the fastener, wherein the first image is taken from a first vantage point via the first camera device, and wherein the second image is taken from a second vantage point via the second camera device, wherein the creating the 3D image of the fastener is performed by at least one processing unit; and
measuring flushness of the fastener, using the 3D image, wherein the measuring flushness is performed by the at least one processing unit.

15. The method according to claim 14, wherein the measuring concentricity comprises:
detecting a first circle corresponding to a first side of the fastener;
detecting a second circle corresponding to a second side of the fastener;
determining a first center of the first circle;
determining a second center of the second circle;
determining an offset distance between the first center and the second center; and
determining whether the offset distance is within a predetermined pass/fail threshold offset distance.

16. The method according to claim 15, further comprising indicating the fastener is defective if the offset distance is not within the predetermined pass/fail threshold offset distance, wherein the indicating the fastener is defective is performed by the at least one processing unit.

17. The method according to claim 14, wherein the measuring flushness of the fastener comprises:
identifying a first surface of the fastener;
identifying a second surface of the part;
fitting a first plane to the first surface;
fitting a second plane to the second surface; and
determining a height difference between the first plane and the second plane, thereby measuring flushness of the fastener.

18. The method according to claim 14, further comprising inspecting a vicinity of the fastener for foreign object debris, wherein the inspecting the vicinity of the fastener for foreign object debris comprises:

applying image processing to detect circular features having a diameter matching a known diameter of a head of the fastener;
applying high pass filtering to eliminate background; and
detecting foreign object debris adjacent the fastener by identifying objects with a surface area that is dissimilar to that of the head of the fastener.

19. The method according to claim 14, wherein the measuring concentricity of the fastener comprises measuring concentricity of a first fastener in a first zone of the part, and wherein the measuring concentricity of the fastener further comprises:
    measuring concentricity of at least one fastener in each of a plurality of zones of the part; and
    measuring concentricity of additional fasteners within a respective zone of the plurality of zones if a different fastener within the respective zone is determined to be defective.

20. A computer readable medium, comprising:
non-transitory computer readable instructions that, when executed by a processing unit, cause the processing unit to perform one or more of the following:
measure concentricity of a fastener installed in a part, using an x-ray image of the fastener;
create a 3D reconstruction of a fastener installed in a part, using a first image of the fastener and a second image of the fastener; and
measure flushness of the fastener with a surface of the part, using the 3D reconstruction.

* * * * *